United States Patent
Kim

(10) Patent No.: US 12,013,249 B2
(45) Date of Patent: Jun. 18, 2024

(54) VEHICLE CAPABLE OF DRIVING IN AN OPTIMAL ROUTE AND A METHOD FOR CONTROLLING THEREOF

(71) Applicants: Hyundai Motor Company, Seoul (KR); Kia Motors Corporation, Seoul (KR)

(72) Inventor: Byung Gil Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 347 days.

(21) Appl. No.: 17/038,117

(22) Filed: Sep. 30, 2020

(65) Prior Publication Data
US 2021/0310818 A1    Oct. 7, 2021

(30) Foreign Application Priority Data
Apr. 7, 2020    (KR) .................. 10-2020-0041902

(51) Int. Cl.
*G01C 21/34* (2006.01)
*B60L 53/66* (2019.01)
*B60L 58/13* (2019.01)
*G01C 21/36* (2006.01)

(52) U.S. Cl.
CPC ........ *G01C 21/3469* (2013.01); *B60L 53/665* (2019.02); *B60L 58/13* (2019.02); *G01C 21/3682* (2013.01)

(58) Field of Classification Search
CPC ................................................ G01C 21/3469
See application file for complete search history.

(56) References Cited

U.S. PATENT DOCUMENTS

| | | | | |
|---|---|---|---|---|
| 2006/0287841 | A1* | 12/2006 | Hoshi | E02F 9/26 702/182 |
| 2009/0157289 | A1* | 6/2009 | Graessley | B60L 3/12 701/29.5 |
| 2012/0016576 | A1* | 1/2012 | Huang | G01C 21/3469 701/423 |
| 2013/0013183 | A1* | 1/2013 | Surnilla | G01C 21/26 701/123 |

(Continued)

FOREIGN PATENT DOCUMENTS

KR    10-1782830000    8/2012

*Primary Examiner* — Jeffrey C Boomer
(74) *Attorney, Agent, or Firm* — Fox Rothschild LLP

(57) ABSTRACT

A vehicle provides an optimized route by minimizing charging rate and provides optimal charging at charging stations. The vehicle includes a user interface receiving a destination input, a storage storing a map data including location of charging stations and charging fee information of each, a driving guide image, and a guide fuel ratio corresponding to the driving guide image. A display displays a driving route and the image. A controller calculates the driving route and a travelable distance based on the battery SOC, selects a charging station as a stopover when a driving distance along the driving route is greater than the travelable distance, calculates a path through which the vehicle passes through the charging station selected as the stopover, determines target charging amount at the charging station selected as the stopover based on the guide fuel ratio and the path, and displays the target charging amount.

20 Claims, 10 Drawing Sheets

(56) References Cited

U.S. PATENT DOCUMENTS

| | | | |
|---|---|---|---|
| 2015/0039215 A1* | 2/2015 | Wu | G01C 21/3415 |
| | | | 701/123 |
| 2015/0088409 A1* | 3/2015 | Thomas | G01C 21/3697 |
| | | | 701/400 |
| 2015/0106001 A1* | 4/2015 | Lee | G01C 21/3626 |
| | | | 701/123 |
| 2016/0349075 A1* | 12/2016 | Son | G01C 21/3469 |
| 2020/0333148 A1* | 10/2020 | Qiu | G01C 21/3476 |

* cited by examiner

FIG. 9

|  | ERROR RATE(%) | | | | | | | |
|---|---|---|---|---|---|---|---|---|
|  | 5~10 | 10~15 | 15~20 | 20~25 | 25~30 | 30~35 | 35~40 | 40~45 | 45~50 |
| CORRECTION RATE FOR CURRENT FUEL EFFICIENCY (%) | 10 | 15 | 20 | 25 | 30 | 35 | 40 | 45 | 50 |

VEHICLE CAPABLE OF DRIVING IN AN OPTIMAL ROUTE AND A METHOD FOR CONTROLLING THEREOF

CROSS-REFERENCE TO RELATED APPLICATION(S)

The present application claims priority to Korean Patent Application No 10-2020-0041902, filed on Apr. 7, 2020, the entire contents of which is incorporated herein for all purposes by this reference.

BACKGROUND

Field of the Disclosure

The present disclosure relates to a vehicle and a control method thereof for the purpose of logistics delivery using electric energy, and more particularly, to a vehicle and a control method capable of driving in an optimal path for logistics delivery.

Description of Related Art

A vehicle is a type of transportation capable of transporting humans, objects or animals from one location to another while driving along a road or track. Examples of the vehicle may include a three-wheeled or four-wheeled vehicle, a two-wheeled vehicle such as a motorcycle, a construction machine, a prime mover bicycle, a bicycle, and a train running on a track.

In recent years, the development of electric vehicles traveling using electric energy without using fossil fuels has expanded, and electric vehicles are more economical in terms of fuel prices than internal combustion engine vehicles using fossil fuels. In order to utilize the electric vehicle more economically, drivers operate the vehicle in the direction of conserving the battery charge as much as possible even if the charging time is long. At this time, there is a need for a technique that provides an optimal route for minimizing charging fares and an optimal charging amount at charging stations.

SUMMARY

One aspect of the disclosed disclosure provides a vehicle and controlling method capable of providing an optimal route for minimizing a charging fare and an optimal charging amount at a charging station.

In accordance with an aspect of the present disclosure, a vehicle may include a battery configured to supply power to a motor in the vehicle; a battery sensor configured to measure state of charge (SOC) of the battery; an user interface configured to receive destination from an user; a storage configured to store a map data including location of a plurality of charging stations and charging fee information of each of the plurality of charging stations, and a driving guide image, and a guide fuel ratio corresponding to the driving guide image; a display configured to display a driving route of the vehicle and the driving guide image; and a controller configured to calculate the driving route to the destination based on the destination and calculate a travelable distance of the vehicle based on a state of charge of the battery, select at least one charging station among the plurality of charging station included in the map data as a stopover based on the driving route to the destination and the map data stored in the storage when a driving distance along the driving route to the destination is greater than the travelable distance, calculate a path through which the vehicle passes through at least one charging station selected as the stopover, determine target charging amount at each of the at least one charging station selected as the stopover based on the guide fuel ratio and the path through which the vehicle passes through the at least one charging station, and display the target charging amount at each of the at least one charging station selected as the stopover and the passing through by operating the display.

The controller may be configured to calculate an average fuel ratio based on the charging state of the battery and the driving distance of the vehicle from the time when the display displays the driving guide image. The controller may be configured to output a message confirming whether the driver intends to travel according to the driving guide image when an error between the guide fuel ratio and the average fuel ratio of the vehicle is greater than or equal to a preset value.

The user interface may be configured to receive an input confirming that the driver does not intend to travel according to the driving guide image, and the controller may be configured to determine a first weight applied to the guide fuel ratio and a second weight applied to the average fuel ratio based on the error between the guide fuel ratio and the average fuel ratio of the vehicle in response to receiving the input confirming that there is no intention to drive according to the driving guide image, and calculate a corrected fuel ratio by applying the first weight to the guide fuel ratio and applying the second weight to the average fuel ratio.

The controller may be configured to determine target charging amount at each of the at least one charging stations selected as the stopover based on the corrected fuel ratio and the path through which the vehicle passes through the at least one charging station. The controller may be configured to display an error between the guide fuel ratio and the average fuel ratio of the vehicle by operating the display. The controller may be configured to determine an instantaneous fuel ratio of the vehicle based on a state of the battery for a predetermined time and a moving distance of the vehicle for the predetermined time, and display an error between the guide fuel ratio and the instantaneous fuel ratio of the vehicle by operating the display. The controller may be configured to determine the lowest charging station among the plurality of charging stations based on charging rates of the plurality of charging stations included in the map data and the driving distance increased when passing through each of the plurality of charging stations, and select the lowest charging station as the stopover, and determine the target charge amount at the lowest charging station to be 100%.

Additionally, the controller may be configured to determine a first pass through charging station located within the travelable distance based on charging rate of the plurality of charging stations included in the map data and the driving distance increased when passing through each of the plurality of charging stations when the distance to the lowest charging station is greater than the driving distance, and select the first pass through charging station as the stopover, and determine the target charge amount at the first pass through charging station based on the distance between the first pass through charging station and the lowest charging station.

The controller may be configured to determine a second pass through charging station located between the lowest charging station among the plurality of charging stations and the destination based on the charging rate of the plurality of charging stations included in the map data and the driving distance increased when passing through each of the plurality of charging stations when the distance from the lowest charging station to the destination is greater than the driving distance of the vehicle when the battery is fully charged and select the second pass through charging station as the stopover.

In accordance with an aspect of the present disclosure, a controlling method of a vehicle may include receiving destination from an user; calculating a driving route to the destination based on the destination; calculating a travelable distance of the vehicle based on a state of charge of the battery; selecting at least one charging station among the plurality of charging station included in the map data as a stopover based on the driving route to the destination and the map data stored in a storage when a driving distance along the driving route to the destination is greater than the travelable distance, calculating a path through which the vehicle passes through at least one charging station selected as the stopover, determining target charging amount at each of the at least one charging station selected as the stopover based on the guide fuel ratio and the path through which the vehicle passes through the at least one charging station; displaying the driving guide image by operating display of the vehicle; and displaying the target charging amount at each of the at least one charging station selected as the stopover and the passing through by operating the display.

The method may further include calculating an average fuel ratio based on the charging state of the battery and the driving distance of the vehicle from the time when the display displays the driving guide image. The method may include outputting a message confirming whether the driver intends to travel according to the driving guide image when an error between the guide fuel ratio and the average fuel ratio of the vehicle is greater than or equal to a preset value.

Additionally, the method may include receiving an input confirming the driver does not intend to travel according to the driving guide image, and determining a first weight applied to the guide fuel ratio and a second weight applied to the average fuel ratio based on the error between the guide fuel ratio and the average fuel ratio of the vehicle when receiving the input confirming that there is no intention to drive according to the driving guide image, and calculating a corrected fuel ratio by applying the first weight to the guide fuel ratio and applying the second weight to the average fuel ratio.

The method may further include determining target charging amount at each of the at least one charging stations selected as the stopover based on the corrected fuel ratio and the path through which the vehicle passes through the at least one charging station. The method may further include determining an error between the guide fuel ratio and the average fuel ratio of the vehicle; and displaying the error between the guide fuel ratio and the average fuel ratio of the vehicle by operating the display. The method may include determining an instantaneous fuel ratio of the vehicle based on a state of the battery for a predetermined time and a moving distance of the vehicle for the predetermined time, and displaying an error between the guide fuel ratio and the instantaneous fuel ratio of the vehicle by operating the display.

Determining target charging amount at each of the at least one charging station selected as the stopover based on the guide fuel ratio and the path through which the vehicle passes through the at least one charging station stored in the storage may include determining the lowest charging station among the plurality of charging stations based on charging rates of the plurality of charging stations included in the map data and the driving distance increased when passing through each of the plurality of charging stations, selecting the lowest charging station as the stopover, and determining the target charge amount at the lowest charging station to be 100%.

Determining target charging amount at each of the at least one charging station selected as the stopover based on the guide fuel ratio and the path through which the vehicle passes through the at least one charging station stored in the storage may include determining a first pass through charging station located within the travelable distance based on charging rate of the plurality of charging stations included in the map data and the driving distance increased when passing through each of the plurality of charging stations when the distance to the lowest charging station is greater than the driving distance, selecting the first pass through charging station as the stopover, and determining the target charge amount at the first pass through charging station based on the distance between the first pass through charging station and the lowest charging station.

In addition, determining target charging amount at each of the at least one charging station selected as the stopover based on the guide fuel ratio and the path through which the vehicle passes through the at least one charging station stored in the storage may include determining a second pass through charging station located between the lowest charging station among the plurality of charging stations and the destination based on the charging rate of the plurality of charging stations included in the map data and the driving distance increased when passing through each of the plurality of charging stations when the distance from the lowest charging station to the destination is greater than the driving distance of the vehicle when the battery is fully charged; and selecting the second pass through way point as the stopover.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 9 shows a table capable of correcting the current fuel efficiency according to an error between the guide fuel ratio and the current fuel ratio according to an exemplary embodiment.

DETAILED DESCRIPTION

Figure 1:
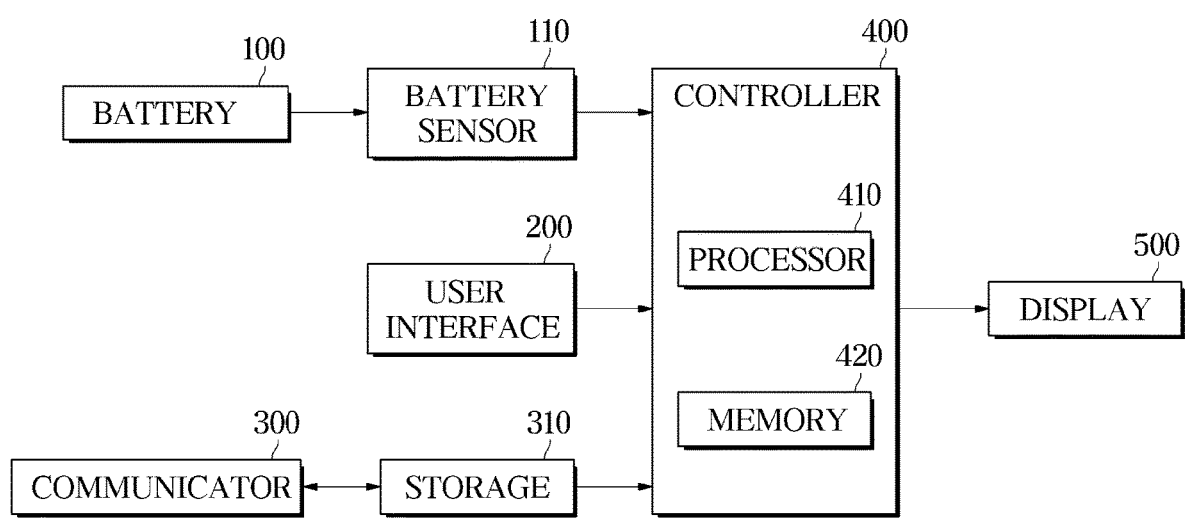
FIG. 1 is a block diagram illustrating a configuration of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, like reference numerals refer to like elements throughout the specification. This specification does not describe all elements of the embodiments, and in the Field of the Invention to which an exemplary embodiment of the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network". The terms first, second, etc. are used to distinguish one component from another component, and the component is not limited by the terms described above. An expression used in the singular encompasses the expression of the plural, unless it has a clearly different meaning in the context. The reference numerals used in operations are used for descriptive convenience and are not intended to describe the order of operations and the operations may be performed in a different order unless otherwise stated.

Hereinafter, exemplary embodiments of the present disclosure will be described with reference to the accompanying drawings.

FIG. 1 is a block diagram illustrating a configuration of a vehicle according to an exemplary embodiment. As shown in FIG. 1, a vehicle according to an exemplary embodiment may include a battery 100 configured to store electrical energy and provide electrical energy to a motor of a vehicle, battery sensor 110 configured to detect the charge state of the battery 100, user interface 200 configured to receive various commands from the user, communicator 300 configured to receive various information from an external server, a storage 310 configured to store various information necessary for the control of the vehicle, a controller 400 configured to generate various control signals for operating the components in the vehicle and display 500 providing various information related to a vehicle to a user.

The battery 100 according to an exemplary embodiment may be configured to store electric energy for driving a vehicle and supply driving energy to a motor. Accordingly, the battery 100 may include a plurality of cells, and each of the plurality of cells may be configured to supply power to output energy. At this time, the output energy that each of the plurality of cells can output may vary based on the temperature and the state of charge. In addition, the battery 100 may include a battery sensor 110 configured to measure a state of charging (SOC) of the battery 100, and the battery sensor 110 may be configured to measure the SOC of the measured battery 100, and deliver the measured SOC to the controller 400.

The user interface 200 according to an exemplary embodiment may include any configuration that enables an interface between a vehicle and a user. For example, the user interface 200 may include a touch input device using the display 500, and may be configured to transmit various commands to the vehicle by directly touching or approaching the touch pad or the touch screen using an input tool such as a finger or a touch pen. The above touch input device may be implemented in a vehicle audio video navigation (AVN) device, but is not limited thereto.

In addition, the user interface 200 may include a speaker, and the driver may be configured to transmit various commands to the vehicle by voice. Such a speaker may be provided anywhere that may receive voice from the driver of the vehicle. The communicator 300 according to an exemplary embodiment may be configured to receive external information including at least one of real-time traffic information, road information, and map data including charging station information from an external server.

In addition, communicator 300 may be configured to receive a guide fuel ratio corresponding to the set driving guide image and the driving guide image based on real-time traffic information from an external server. Accordingly, communicator 300 may include a controller area network (CAN) communication module, a Wi-Fi communication module, a USB communication module, and a Bluetooth communication module. In addition, communicator 300 may further include a broadcasting communication module such as TPEG, SXM, RDS such as DMB.

The storage 310 according to an exemplary embodiment may be configured to store map data including locations of a plurality of charging stations and charging rate information of each of the plurality of charging stations, and store a driving guide image and a guide fuel ratio corresponding to the driving guide image. At this time, the map data, the driving guide image according to the current traffic situation, and the guide fuel ratio corresponding to the driving guide image may be transmitted from communicator 300, input by a user, or preset and stored when manufacturing a vehicle.

Storage 310 for this purpose may be implemented through a storage medium of at least one of a memory type (flash memory type), hard disk type (hard disk type), multimedia card micro type (multimedia card micro type), card type memory (for example, SD or XD memory 420, etc.), RAM (Random Access Memory: RAM), SRAM (Static Random Access Memory), ROM (Read-Only Memory), EEPROM (Electrically Erasable Programmable Read-Only Memory), PROM (Programmable Read-Only Memory), magnetic memory, a magnetic disk and an optical disk.

The controller 400 according to an exemplary embodiment may be configured to select at least one charging station as a stopover and determine a target charging amount at each of the at least one charging station selected as a stopover based on the state of charge of the battery 100 received from the battery sensor 110, the destination of the vehicle received from the user interface 200, map data received from the storage 310 and/or communicator 300, guide fuel ratio. In addition, the controller 400 may be configured to operate the display 500 to display a target charging amount at each of at least one charging station selected as a vehicle driving route and a stopover.

The specific role of the controller 400 will be described later with reference to FIGS. 2 to 4. Accordingly, the controller 400 may be implemented by the memory 420 for storing data for an algorithm or a program for reproducing the algorithm for controlling the operation of components in the vehicle, and the processor 410 may be configured to perform the above-described operation using the data stored in the memory 420. In particular, the memory 420 and the processor 410 may be implemented as separate chips, respectively. Alternatively, the memory 420 and the processor 410 may be implemented as a single chip. At this time, the memory 420 may be replaced with storage 310. Additionally, the controller 400 may be configured to transmit a signal to an electronic control unit (ECU) or a terminal. In particular, a signal may be transmitted using a CAN communication method.

The battery sensor 110, the user interface 200, the communicator 300, the storage 310, and the display 500 according to an exemplary embodiment may be configured to transmit respective information by performing communication with the controller 400 and a CAN. In other words, a communication network including a body network, a multimedia network, and a chassis network in the vehicle for control of various electric loads mounted on a vehicle and communication between various electric loads is composed, and each network separated from each other may be connected by the controller 400 to transmit and receive CAN communication messages.

The display 500 according to an exemplary embodiment may provide a user with information related to a vehicle in the form of an image or text. Although the display 500 and the user interface 200 are separately illustrated in FIG. 1, the user interface 200 may include a display 500. For example, the display 500 may be configured to display the driving route of the vehicle based on the control signal of the controller 400. Additionally, the display 500 may be configured to display a driving guide image based on the control signal of the controller 400. Accordingly, the display 500 may be formed by being embedded in the center fascia. However, the installation example of the display 500 is not limited thereto, and the display 500 may be provided to be separated from the center fascia of the vehicle.

In addition, a plurality of displays 500 may be provided, and the display 500 displaying a driving guide image and the display 500 displaying a driving route may be divided. For example, the display 500 may include a first display provided in the cluster to display the driving guide image, and a second display provided in the AVN device to display the driving route. At this time, the display 500 may be implemented by a liquid crystal display (LCD), a light emitting diode (LED), a plasma display panel (PDP), an organic light emitting diode (OLED), a cathode ray tube (CRT), etc., but it is not limited to thereof.

Each component of another vehicle is described above in one exemplary embodiment. Hereinafter, a process of determining at least one charging station among a plurality of charging stations as a stopover, and determining a target charging amount at at least one charging station set as a stopover in detail, with reference to FIGS. 2 to 10 are explained below.

Figure 2:
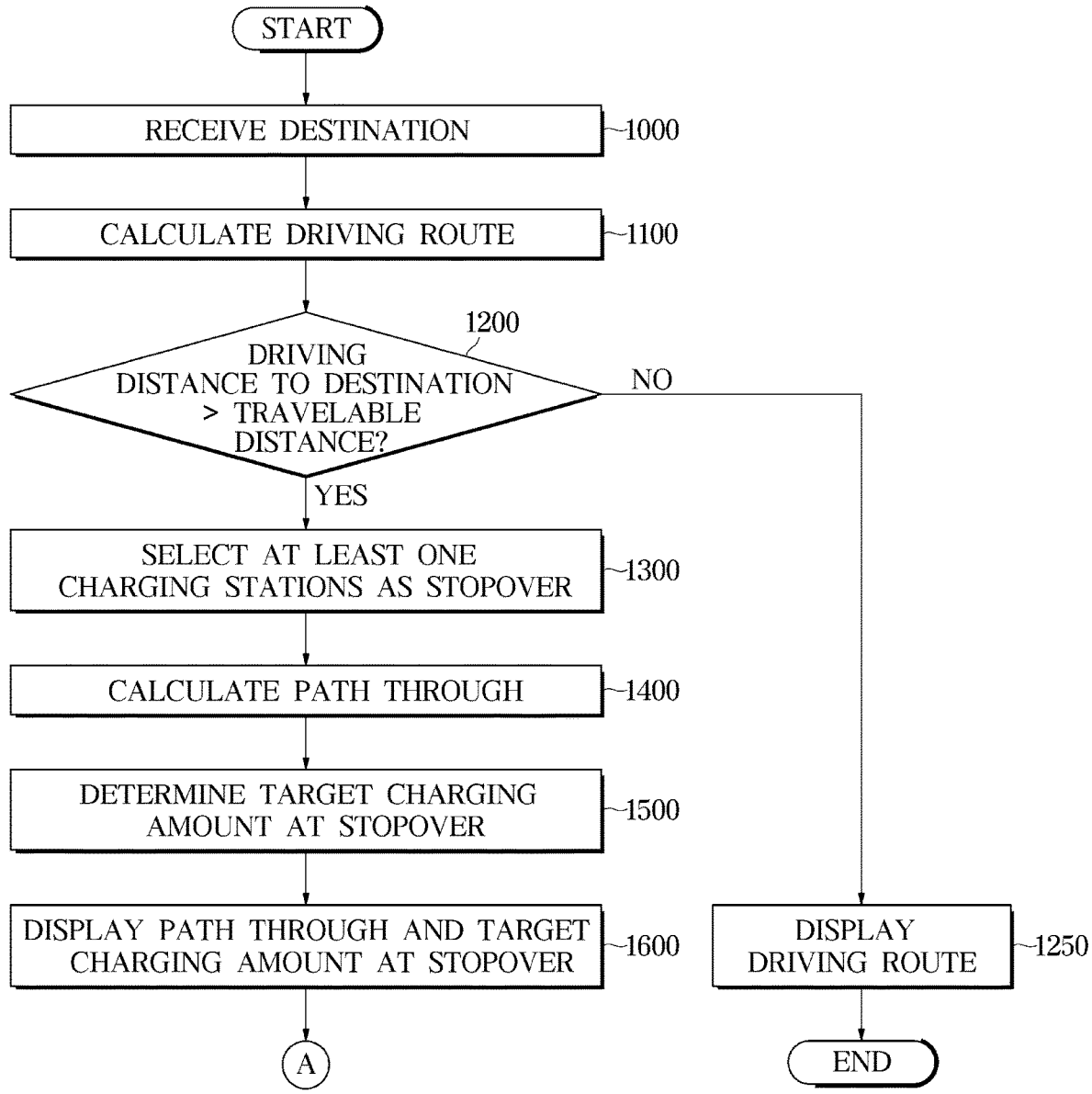
FIGS. 2 to 4 are flowcharts illustrating a method of controlling a vehicle according to an exemplary embodiment.
Figure 3:
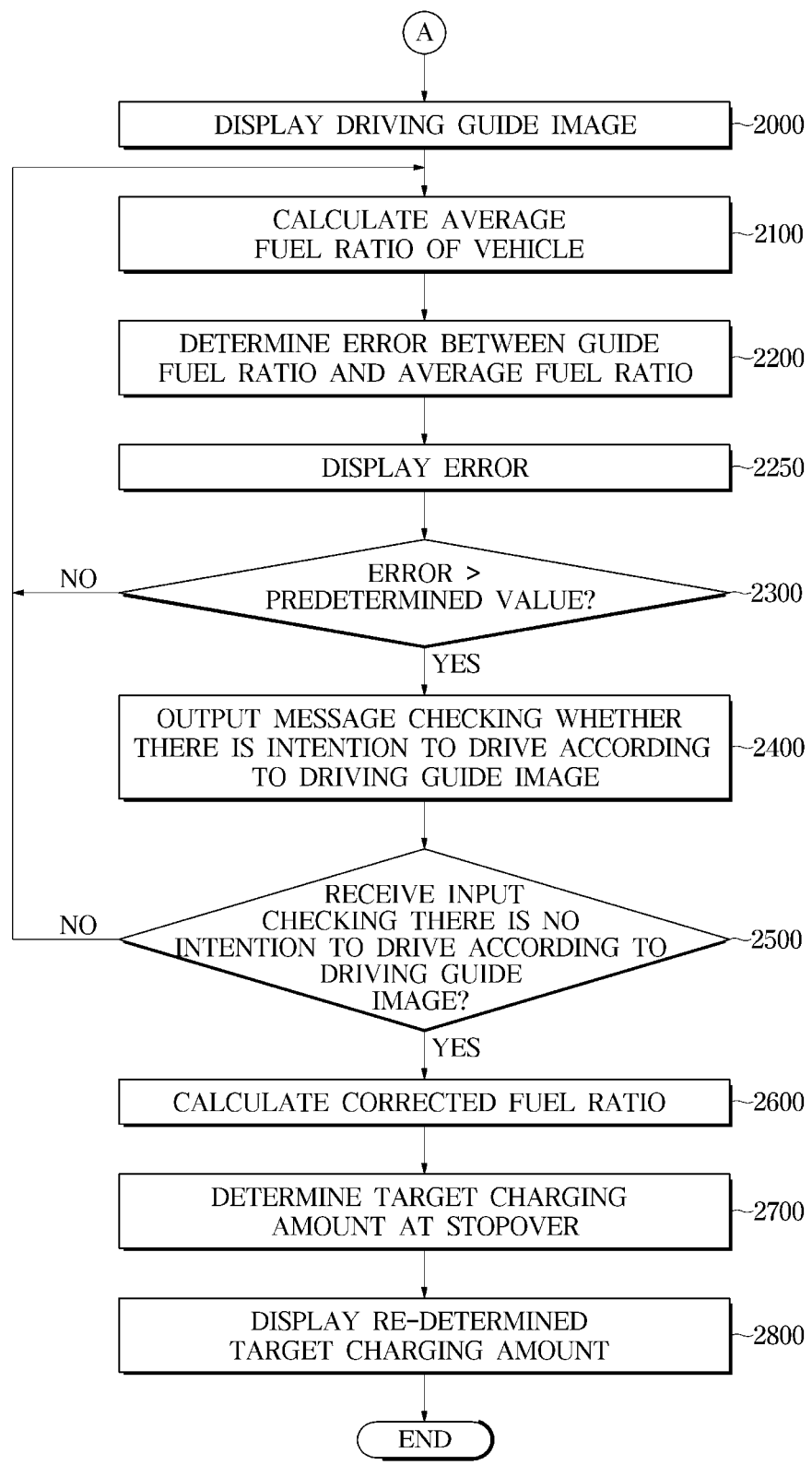
Figure 4:
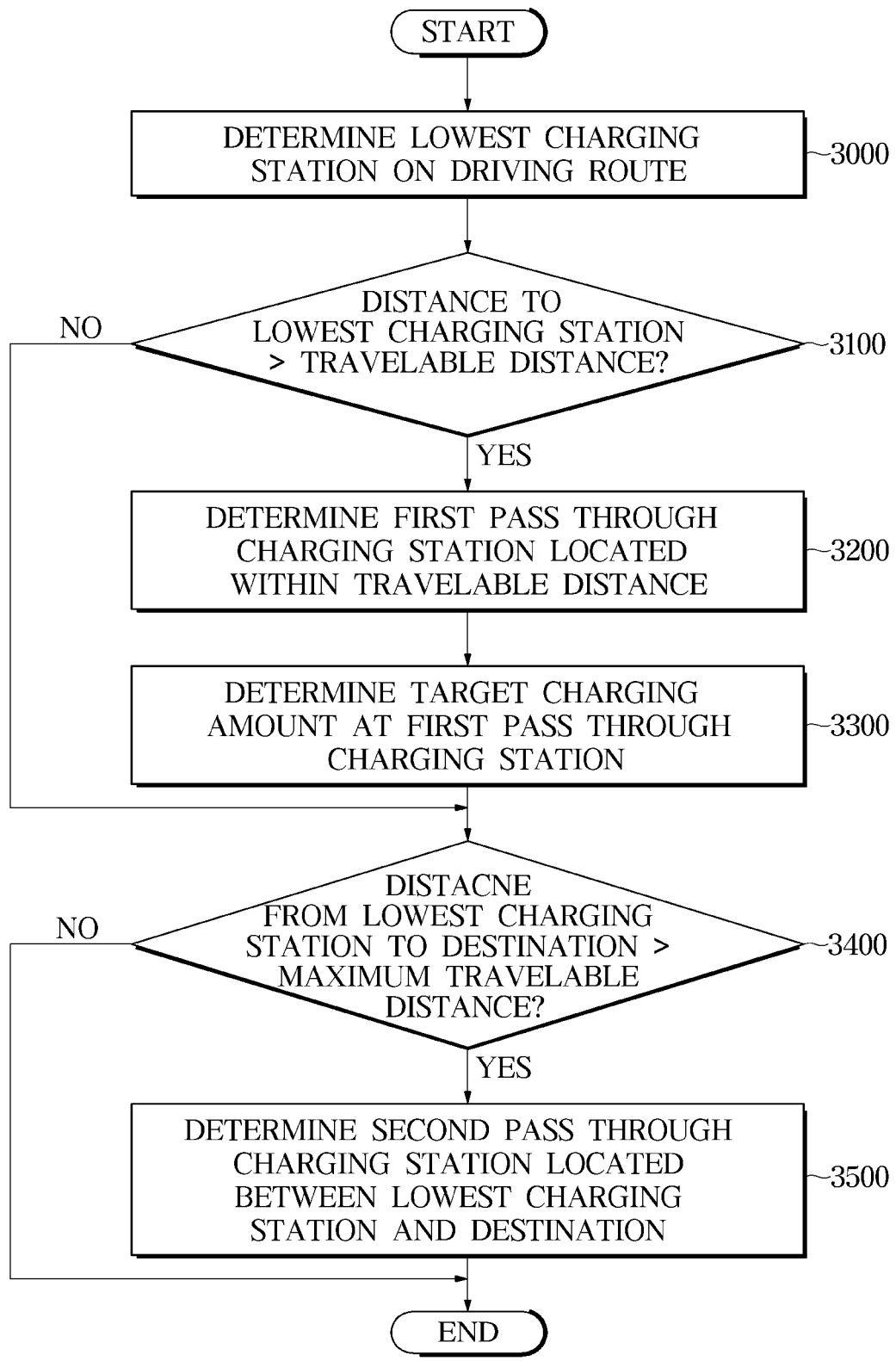
Figure 5:
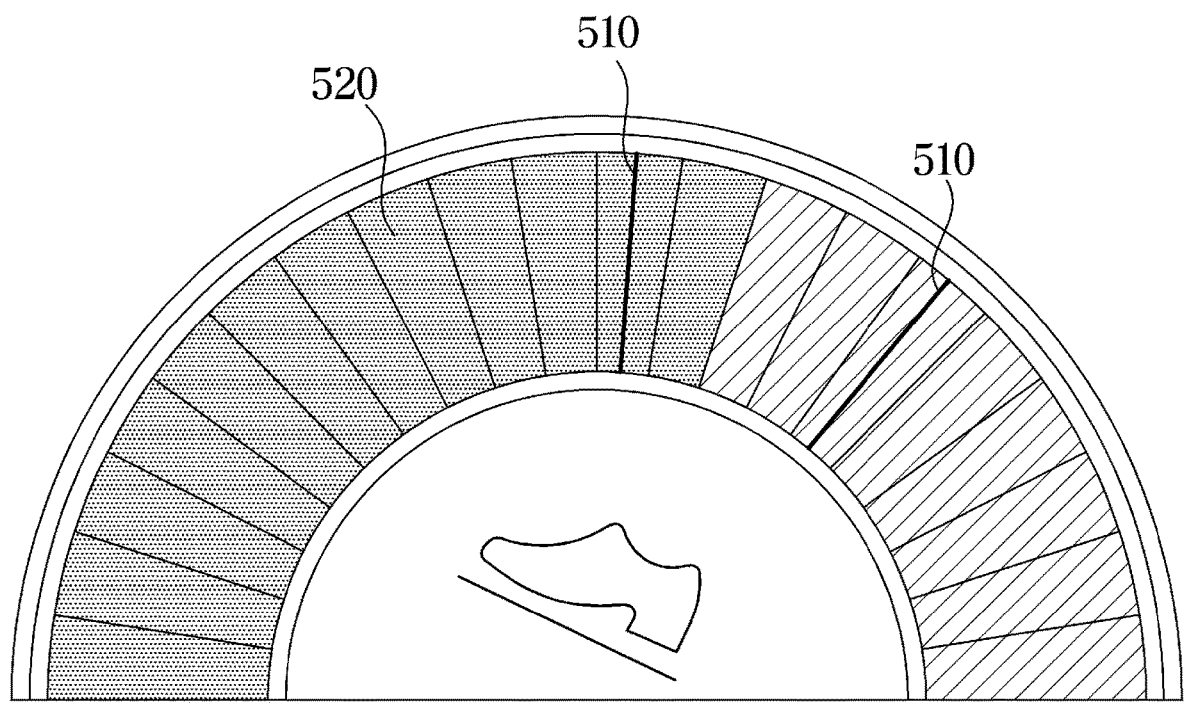
FIG. 5 is a diagram illustrating an image of a driving guide according to an exemplary embodiment.
Figure 6:
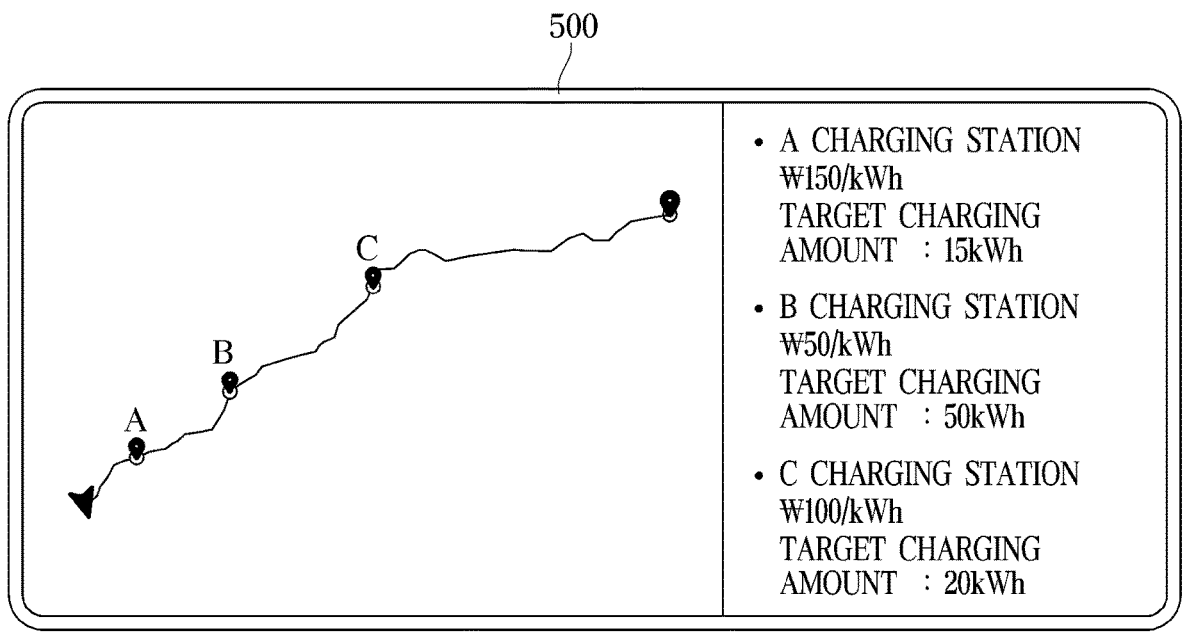
FIG. 6 is a diagram illustrating situation in which a vehicle provides an optimal charging amount to a driver for a plurality of charging stations set as a stopover according to an exemplary embodiment.
Figure 7:
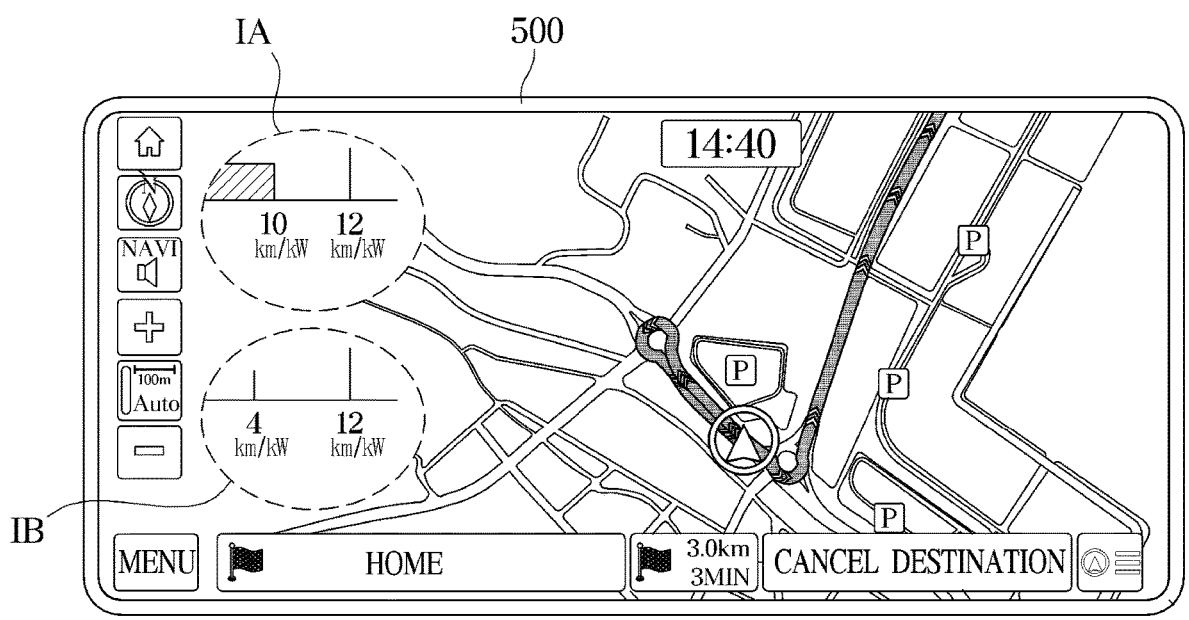
FIG. 7 is a diagram illustrating a situation in which a vehicle provides an error between a guide fuel ratio and a current vehicle fuel ratio according to an exemplary embodiment.
Figure 10:
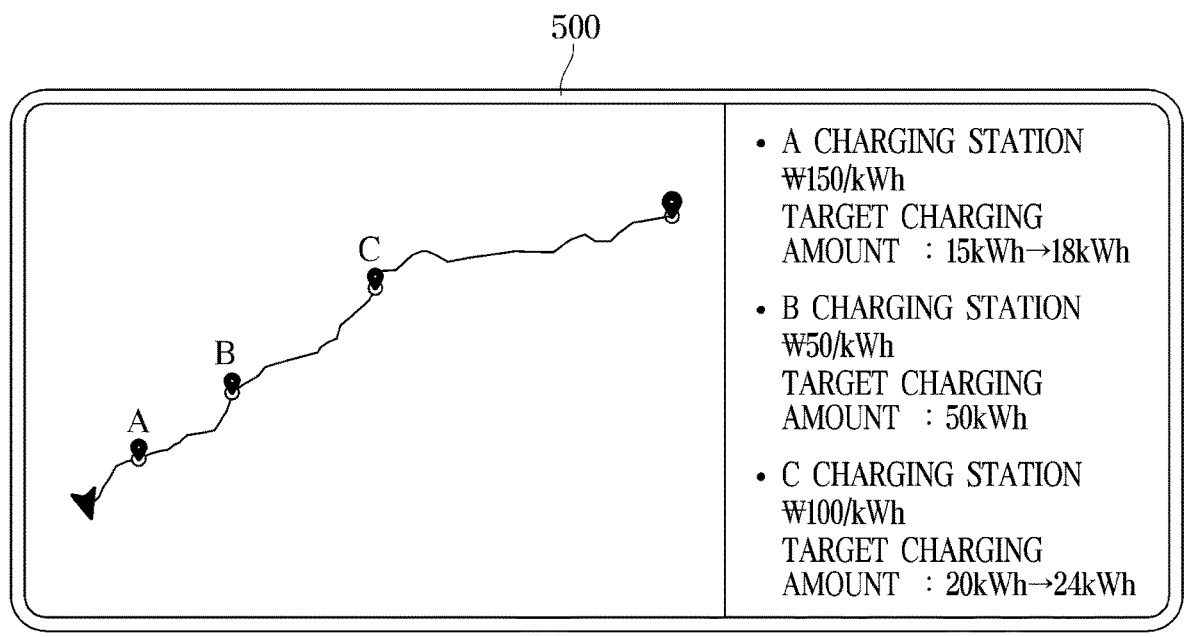
FIG. 10 is a diagram illustrating a situation in which a vehicle according to an exemplary embodiment changes an optimal charging amount for a plurality of charging stations set as a stopover.

FIGS. 2 to 4 are flowcharts illustrating a method of controlling a vehicle according to an exemplary embodiment. FIG. 5 is a diagram illustrating an image of a driving guide according to an exemplary embodiment. FIG. 6 is a diagram illustrating situation in which a vehicle provides an optimal charging amount to a driver for a plurality of charging stations set as a stopover according to an exemplary embodiment. FIG. 7 is a diagram illustrating a situation in which a vehicle provides an error between a guide fuel ratio and a current vehicle fuel ratio according to an exemplary embodiment. FIG. 9 shows a table capable of correcting the current fuel efficiency according to an error between the guide fuel ratio and the current fuel ratio. FIG. 10 is a diagram illustrating a situation in which a vehicle according to an exemplary embodiment changes an optimal charging amount for a plurality of charging stations set as a stopover.

Referring to FIG. 2, the user interface 200 may be configured to receive a destination from a driver, and the controller 400 may be configured to receive a destination (1000). The controller 400 may be configured to calculate a driving route to the destination based on the real-time traffic conditions received from the communicator 300 and the location of the destination (1100). The controller 400 may be configured to calculate the travelable distance of the vehicle based on the state of charge of the battery 100 received from the battery sensor 110.

At this time, when the driving distance according to the driving route to the destination is less than the travelable distance, the controller 400 may be configured to operate the display 500 to display the driving route to the destination (1250). On the other hand, if the driving distance along the driving route to the destination is greater than the travelable distance (YES in 1200), at least one charging station may be selected as a stopover based on the driving route to the destination and map data received from communicator 300 and stored in storage 310 (1300).

A specific process in which the controller 400 selects at least one charging station as a stopover based on driving route to the destination and map data will be described later with reference to FIG. 4. Referring to FIG. 4, the controller 400 may be configured to determine the lowest charging station with the least amount of money required to fully charge the vehicle based on the driving route to the destination and map data (3000). Specifically, the controller 400 may be configured to determine the lowest charging station among the plurality of charging stations based on the charging rates of the plurality of charging stations included in the map data and the driving distance increased when passing through the plurality of charging stations.

For example, assuming that the increase in mileage when passing through the first charging station is 6 km and the charging rate at the first charging station is 50 W/kWh, and assuming that the mileage increasing when going through the second charging station is 2 km and the charging rate at the second charging station is 50 W/kWh, the controller 400 may be configured to determine the second charging station as the lowest charging station. As another example, assuming that the capacity of the battery 100 for full charging is 50 kWh and the vehicle's fuel ratio is 10 km/kWh, if the mileage increasing when going through the first charging station is 15 km, and the charging rate at the first charging station is 50 W/kWh, the charge rate expected to be consumed at the first charging station can be determined as 2575 won, which is the result of (50 kWh*50 W/kWh+(50 W/kWh*15 km/kWh/10 km)).

In addition, if the driving distance increased when passing through the second charging station under the above conditions is 2 km, and the charging rate at the second charging station is 51 W/kWh, the charge rate expected to be spent at the second charging station can be determined as 2560 won, which is the result of (51 kWh*50 W/kWh+(50 W/kWh*2 km/kWh/10 km)). In other words, the charging rate per kWh as above is the first charging station is cheaper than the second charging station, the second charging station may be determined as the lowest charging station in consideration of the respective driving distances increased when passing through the first charging station and the second charging station.

When the controller 400 determines the lowest charging station, the lowest charging station may be selected as a stopover, and the target charging amount at the lowest charging station may be determined as 100%. For example, if the expected discharge amount of the battery 100 when reaching the lowest charging station is 50 kWh, the target charge amount may be determined as 50 kWh. This is to reduce the economic burden of the driver by charging the battery 100 at the lowest charging station.

If the distance to the lowest charge station is greater than the vehicle's travelable distance, based on the charging rates of a plurality of charging stations included in the map data and the mileage increased when passing through each of the plurality of charging stations, the controller 400 may be configured to determine a first diesel charging station located within a travelable distance among a plurality of charging stations (3200). When the controller 400 determines the first diesel charging station, the distance between each of the plurality of charging stations and the lowest charging station may also be considered.

For example, when the charging rate at the lowest charging station is 50 W/kWh, assuming that the charging rate of the first charging station located within the travelable distance is 100 W/kWh, and the distance from the first charging station to the lowest charging station is 20 km, then expected damage estimate can be 1000 won, which is the result of ((100 kWh−50 kWh)*20 km), and assuming that the charging rate of the second charging station located within the travelable distance is 120 W/kWh, and the distance from the second charging station to the lowest charging station is 10 km, then the expected amount of damage expected may be 700 won, which is the result of ((120 kWh−50 kWh)*10 km).

In the case of the above example, a second charging station with a relatively small loss estimate may be determined as a first pass through charging station. The controller 400 may be configured to select the first pass through charging station as the stopover, and determine a target charging amount at the first pass through charging station based on the distance between the first pass through charging station and the lowest charging station (3300).

The target charging amount at the first pass through charging station may be determined as a charging amount reaching the lowest charging station. For example, if the vehicle's fuel consumption is 10 km/kWh and the distance between the first pass through charging station and the lowest charge station is 20 km, the target charging amount at the first pass through charging station may be determined as 2 kWh.

If the distance from the lowest charge station to the destination is greater than the travelable distance of the vehicle when the battery 100 is fully charged, the controller 400 may be configured to determine a second gas station located between the lowest charge station and the destination among a plurality of charging stations, and select the second pass through charging station as a stopover based on the charging rate of a plurality of charging stations included in the map data and the mileage increased when passing through each of the plurality of charging stations (3500).

As described above, the controller 400 may provide the user with the optimal charging amount at each charging station set as a stopover by determining the minimum charging station and determining the required charging amount to ensure the maximum charging amount at the lowest charging station. Referring back to FIG. 2, when the controller 400 selects at least one charging station as a stopover, the controller 400 may be configured to calculate a path through which the vehicle passes through at least one charging station selected as a stopover (1400).

In addition, the controller 400 may be configured to determine a target charging amount at each of at least one charging station selected as a stopover based on a guide fuel ratio and a path through corresponding to a driving guide image stored in storage 310 (1500). The controller 400 may be configured to operate the display 500 to display a target charging amount at each of at least one charging station selected as path through and stopover (1600).

Referring to FIG. 3, the display 500 may be configured to output a driving guide image based on the control signal of the controller 400 (2000). In other words, the display 500 may be configured to output a target charging amount at each of at least one charging station selected as a path through, a stopover, and a driving guide image based on the control signal of the controller 400.

Referring to FIG. 5, a driving guide image in a driving situation of a vehicle is an image showing a range 510 of the depth of the accelerator pedal and a depth 520 of the accelerator pedal changed by the driver. It may mean an image for guiding engagement of the accelerator within the depth range 510. In addition, the driving guide image in the braking situation of the vehicle is an image showing the range 510 of the depth of the brake pedal and the depth 520 of the depth of the brake pedal changed by the driver. It may mean an image that guides the driver to engage the accelerator pedal within a range 510 of the depth of the accelerator pedal.

The guide fuel ratio corresponding to the driving guide image may mean the average fuel ratio of the vehicle that may be secured when the driver engages the accelerator pedal within a range of the depth of the accelerator pedal and depresses the brake pedal within a range of the depth of the brake pedal. For example, if the expected minimum fuel ratio when the driver depresses the accelerator pedal and the brake pedal according to the driving guide image is 12 km/kW, the guide fuel ratio corresponding to the driving guide image may be set to 12 km/kW.

Referring to FIG. 6, a path through (e.g., a pass through charging station) and a target charging amount at each charging station are displayed on the display 500 according to the control signal of the controller 400. Specifically, at least one charging station selected as a stopover is a charging station A, a charging station B and a charging station C, and FIG. 6 shows that the target charging amount at the A charging station was determined to be 15 kWh, the target charging amount at the B charging station was 50 kWh, and the target charging amount at the C charging station was determined to be 20 kWh.

Assuming that the maximum capacity of the battery 100 is 50 kWh, it may be confirmed that the charging station A is the first pass through charging station, the charging station B is the lowest charging station, and the charging station C is the second pass through charging station. In other words, the target charging amount at the charging station A is the minimum charging amount to reach the charging station B, the target charging amount at the charging station B is the maximum charging amount to fully charge the battery 100, and the target charging amount at the charging station C may be an optimal charging amount to reach the charging station C again after reaching the destination.

The controller 400 may be configured to calculate the average fuel ratio of the vehicle based on the state of charge of the battery 100 and the driving distance of the vehicle (2100) from the time when the display 500 transmits a control signal to display the driving guide image, that is, from the time when the display 500 displays the driving guide image. For example, if the driving distance of the vehicle from the time when the display 500 displays the driving guide image is 10 km and the power consumption of the battery 100 from the time when the display 500 displays the driving guide image is 1 kWh, the controller 400 may be configured to calculate the average fuel ratio at 10 km/kWh.

The controller 400 may be configured to determine an error between the guide fuel ratio and the average fuel ratio of the vehicle (2200), and display an error between the guide fuel ratio and the average fuel ratio of the vehicle by operating the display 500 (2250). Accordingly, the driver may confirm whether he is driving the vehicle by following the driving guide image well. In addition, the controller 400 may be configured to determine the instantaneous fuel ratio of the vehicle based on the charging state of the battery 100 for a short period of time set in advance and the moving distance of the vehicle, and display an error between the guide fuel ratio and the instantaneous fuel ratio of the vehicle by the display 500 (2250).

Accordingly, the driver may determine whether he is following the driving guide image well in real time. Specifically, referring to FIG. 7, the display 500 may be configured to display an image IA indicating an error between the guide fuel ratio and the average fuel ratio of the vehicle. In addition, the display 500 may be configured to display an image IB indicating an error between the guide fuel ratio and the instantaneous fuel ratio of the vehicle.

The driver may intuitively determine whether he is following the current driving guide image well by referring to the two images IA and IB. However, the method in which the display 500 indicates the error between the guide fuel ratio and the average fuel ratio of the vehicle, or the method showing the error between the guide fuel ratio and the instantaneous fuel ratio of the vehicle is not limited thereto. Therefore, any method may be used as long as the user may intuitively recognize the error.

Referring to FIG. 3 again, if the error between the guide fuel ratio and the average fuel ratio of the vehicle is greater than or equal to a preset value (YES in 2300), the controller 400 may be configured to output a message confirming whether the driver is willing to travel according to the driving guide image by operating the display 500. At this time, the preset value may be preset as a value that serves as a criterion for the fact that the driver is not following the driving guide image.

For example, if the preset value is 4 km/kWh, the guide fuel ratio is 12 km/kWh, and the average fuel consumption of the vehicle is 7 km/kWh, the controller 400 may be configured to operate the display 500 to output a message confirming whether the driver intends to travel according to the driving guide image. At this time, the controller 400 may be configured to determine whether the error between the guide fuel ratio and the average fuel ratio of the vehicle is greater than or equal to a preset value after a preset time has elapsed from the time when the display 500 displays the driving guide image. The preset time may be set to ensure reliability of the average fuel consumption of the vehicle, and may be set to, for example, about 10 minutes.

If the error between the guide fuel ratio and the average fuel ratio of the vehicle is determined shortly after the driving guide image is displayed on the display 500, reliability in the average fuel ratio of the vehicle is not secured. In addition, the controller 400 may be configured to determine whether the error between the guide fuel ratio and the average fuel ratio of the vehicle is greater than or equal to a preset value every predetermined time period.

Figure 8:
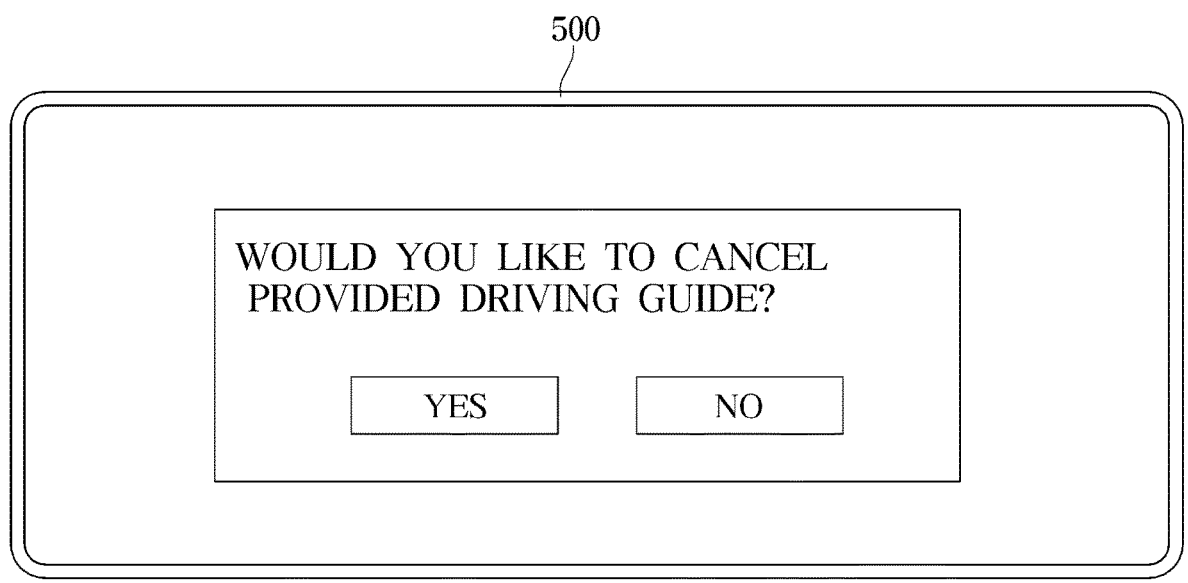
FIG. 8 is a diagram illustrating an image displayed when the error between the fuel guide ratio and an average fuel ratio of the vehicle is equal to or greater than a preset value according to an exemplary embodiment.

Referring to FIG. 8, when the error between the guide fuel ratio and the average fuel ratio of the vehicle is equal to or greater than a preset value, an example of an image displayed on the display 500 may be confirmed. When the user interface 200 includes a touch pad of the display 500, the driver may transmit an input confirming that there is no intention to drive according to the image of the driving guide by touching the box "Yes" to the question of canceling the provided driving guide or other similar type of input manipulation.

Conversely, the driver may transmit an input confirming that he or she intends to drive according to the driving guide image by touching the box "No" to the question of canceling the provided driving guide. When the user interface 200 receives an input from the driver confirming that there is no intention to drive according to the driving guide image (YES in 2500), the controller 400 may be configured to calculate a corrected fuel ratio for changing a target charging amount at each of at least one charging station selected as a stopover (2600).

Specifically, the controller 400 may be configured to determine the first weight to be applied to the guide fuel ratio and the second weight to be applied to the average fuel ratio based on the error between the guide fuel ratio and the average fuel ratio of the vehicle, the corrected fuel ratio may be calculated by applying the first weight to the guide fuel ratio and the second weight to the average fuel ratio. The reason for calculating the corrected fuel ratio is that in the case of the average fuel ratio, it is very difficult to directly utilize it as a fuel ratio for changing the target charging amount at a charging station since it varies greatly with time.

Referring to FIG. 9, a table for an error rate and a correction rate for the error rate is shown, and such a table may be stored in storage 310. For the sake of explanation, assuming that the guide fuel ratio is 12 km/kWh and the average fuel consumption of the vehicle is 8 km/kWh, the error ratio between the guide fuel ratio and the average fuel ratio of the vehicle is 33.3%, and thus, the current fuel ratio correction ratio is 35%. At this time, 0.35 is applied as the weight for the average fuel ratio and 0.65 as the weight for the guide fuel ratio. In other words, the corrected fuel ratio may be determined as 10.6 km/kWh, which is the result of (12 km/kWh*0.65+8 km/kWh*0.35).

As described above, each weight for calculating the corrected fuel ratio can be determined according to the difference between the guide fuel ratio and the average fuel ratio. In addition, the table shown in FIG. 9 is merely an example for calculating the correction ratio, and the above table may be updated based on various experiments. Thereafter, the controller 400 may be configured to re-determine a target charging amount at each of the at least one charging station based on the path through and the corrected fuel ratio at least one charging station as a stopover (2700). This is because the target charging amount determined in step 1500 may be determined based on the guide fuel ratio, and therefore needs to be changed. The controller 400 may be configured to operate the display 500 to display the changed target charge amount (2800).

Referring to FIG. 10, the target charging amount at the A charging station was changed from 15 kWh to 18 kWh, and the target charging amount at the C charging station was changed from 20 kWh to 24 kWh. As described above, when the driver expresses his intention not to follow the driving guide image, it may be possible to provide a more accurate target charging amount at each charging station by re-determining the target charging amount based on the driving habit of the driver.

According to the vehicle and the control method described above with reference to FIGS. 1 to 10, it may be possible to provide convenience to the driver by providing the driver with information regarding how and at what charging station to charge when driving a long distance with an electric vehicle. In addition, by determining the lowest charging station based on the actual consumption cost according to the distance of the charging station, not simply the charging charge of the charging station, it may be possible to allow the driver to achieve the most economical consumption.

Examples of the vehicle and its control method are not limited thereto, and the exemplary embodiments described above are exemplary in all aspects. Therefore, one of ordinary skill in the art to which the present disclosure pertains will understand that the present disclosure may be implemented in other specific forms without changing its technical spirit or essential features. The scope of the present disclosure is shown in the claims rather than the foregoing description, and all differences within the equivalent range should be construed as being included in the present disclosure.

According to one aspect of the disclosed disclosure, when driving a long distance with an electric vehicle, the path through the charging station is automatically provided, so that the convenience of the driver may be improved. In addition, among the various route options to the destination, it is possible to provide information to reach the destination at the lowest fare, allowing the driver to operate the electric vehicle economically.

REFERENCE NUMERALS

100: battery
110: battery sensor
200: user interface
300: communicator
310: storage
400: controller
500: display

What is claimed is:

1. A vehicle, comprising:
    a battery configured to supply power to a motor in the vehicle;
    a battery sensor configured to measure a state of charge (SOC) of the battery;
    a user interface configured to receive a destination as an input from a user;
    a storage configured to store a map data including location of a plurality of charging stations and charging fee information of each of the plurality of charging stations, and a driving guide image, and a guide fuel ratio corresponding to the driving guide image;
    a display configured to display a driving route of the vehicle and the driving guide image; and
    a controller configured to:
        calculate the driving route to the destination based on the received destination and calculate a travelable distance of the vehicle based on a state of charge of the battery,
        select at least one charging station among the plurality of charging stations included in the map data as a stopover based on the driving route to the destination and the map data stored in the storage when a driving distance along the driving route to the destination is greater than the travelable distance,
        calculate a path through which the vehicle passes through at least one charging station selected as the stopover,
        determine a target charging amount at each of the at least one charging station selected as the stopover based on the guide fuel ratio and the path through which the vehicle passes through the at least one charging station,
        display the target charging amount at each of the at least one charging station selected as the stopover and the path through which the vehicle passes through the at least one charging station by operating the display,
        determine a corrected fuel ratio based on an error between the guide fuel ratio and an average fuel ratio of the vehicle in response to receiving the input confirming that there is no intention to drive according to the driving guide image, re-determine the target charging amount at each of the at least one charging station selected as the stopover based on the corrected fuel ratio and the path through which the vehicle passes through the at least one charging station, and display the target charging amount at each of the at least one charging station selected as the stopover and the path through which the vehicle passes through the at least one charging station by operating the display.

2. The vehicle according to claim 1, wherein the controller is configured to calculate the average fuel ratio based on the charging state of the battery and the driving distance of the vehicle from the time when the display displays the driving guide image.

3. The vehicle according to claim 2, wherein the controller is configured to output a message requesting confirmation whether the driver intends or does not intend to travel according to the driving guide image when the error between the guide fuel ratio and the average fuel ratio of the vehicle is greater than or equal to a preset value.

4. The vehicle according to claim 3, wherein the user interface is configured to:

receive an input confirming that the driver does not intend to travel according to the driving guide image;

determine a first weight applied to the guide fuel ratio and a second weight applied to the average fuel ratio based on the error between the guide fuel ratio and the average fuel ratio of the vehicle in response to receiving the input confirming that there is no intention to drive according to the driving guide image;

calculate the corrected fuel ratio by applying the first weight to the guide fuel ratio and applying the second weight to the average fuel ratio.

5. The vehicle according to claim 4, wherein the controller is configured to determine target charging amount at each of the at least one charging stations selected as the stopover based on the corrected fuel ratio and the path through which the vehicle passes through the at least one charging station.

6. The vehicle according to claim 2, wherein the controller is configured to display an error between the guide fuel ratio and the average fuel ratio of the vehicle by operating the display.

7. The vehicle according to claim 1, wherein the controller is configured to determine an instantaneous fuel ratio of the vehicle based on a state of the battery for a predetermined time and a moving distance of the vehicle for the predetermined time, and display an error between the guide fuel ratio and the instantaneous fuel ratio of the vehicle by operating the display.

8. The vehicle according to claim 1, wherein the controller is configured to:

determine the lowest cost charging station among the plurality of charging stations based on charging rates of the plurality of charging stations included in the map data and an increase in the driving distance when passing through each of the plurality of charging stations; and select the lowest cost charging station as the stopover, and determine the target charge amount at the lowest cost charging station to be an expected discharge amount of the battery when reaching the lowest cost charging station.

9. The vehicle according to claim 8, wherein the controller is configured to:

determine a first pass through charging station located within the travelable distance based on charging rate of the plurality of charging stations included in the map data and the increase in the driving distance when passing through each of the plurality of charging stations when a distance to the lowest cost charging station is greater than the travelable distance; and select the first pass through charging station as the stopover, and determine the target charge amount at the first pass through charging station based on the distance between the first pass through charging station and the lowest cost charging station.

10. The vehicle according to claim 9, wherein the controller is configured to:

determine a second pass through charging station located between the lowest cost charging station among the plurality of charging stations and the destination based on the charging rate of the plurality of charging stations included in the map data and the increase in the driving distance when passing through each of the plurality of charging stations when a distance from the lowest cost charging station to the destination is greater than the travelable distance of the vehicle when the battery is fully charged and select the second pass through charging station as the stopover.

11. A controlling method of a vehicle, comprising:

receiving, by a controller, a destination as an input from a user;

calculating, by the controller, a driving route to the destination based on the destination;

calculating, by the controller, a travelable distance of the vehicle based on a state of charge of a battery;

selecting, by the controller, at least one charging station among the plurality of charging stations included in a map data as a stopover based on a driving route to the destination and the map data stored in a storage when a driving distance along the driving route to the destination is greater than the travelable distance;

calculating, by the controller, a path through which the vehicle passes through at least one charging station selected as the stopover, determining, by the controller, a target charging amount at each of the at least one charging station selected as the stopover based on a guide fuel ratio and the path through which the vehicle passes through the at least one charging station;

displaying, by the controller, a driving guide image by operating display of the vehicle;

displaying, by the controller, the target charging amount at each of the at least one charging station selected as the stopover and the path through which the vehicle passes through the at least one charging station by operating the display;

determining, by the controller, a corrected fuel ratio based on an error between the guide fuel ratio and an average fuel ratio of the vehicle in response to receiving the input confirming that there is no intention to drive according to the driving guide image, re-determining, by the controller, the target charging amount at each of the at least one charging station selected as the stopover based on the corrected fuel ratio and the path through which the vehicle passes through the at least one charging station, and displaying, by the controller, the target charging amount at each of the at least one charging station selected as the stopover and the path through which the vehicle passes through the at least one charging station by operating the display.

12. The method according to claim 11 further comprising:
calculating, by the controller, the average fuel ratio based on the charging state of the battery and the driving distance of the vehicle from the time when the display displays the driving guide image.

13. The method according to claim 12 further comprising:
outputting, by the controller, a message requesting confirmation whether the driver intends or does not intend to travel according to the driving guide image when the error between the guide fuel ratio and the average fuel ratio of the vehicle is greater than or equal to a preset value.

14. The method according to claim 13 further comprising:
receiving, by the controller, an input confirming the driver does not intend to travel according to the driving guide image; and
determining, by the controller, a first weight applied to the guide fuel ratio and a second weight applied to the average fuel ratio based on the error between the guide fuel ratio and the average fuel ratio of the vehicle when receiving the input confirming that there is no intention to drive according to the driving guide image, and calculating the corrected fuel ratio by applying the first weight to the guide fuel ratio and applying the second weight to the average fuel ratio.

15. The method according to claim 14 further comprising:
determining, by the controller, target charging amount at each of the at least one charging stations selected as the stopover based on the corrected fuel ratio and the path through which the vehicle passes through the at least one charging station.

16. The method according to claim 12 further comprising:
determining, by the controller, the error between the guide fuel ratio and the average fuel ratio of the vehicle; and
displaying, by the controller, the error between the guide fuel ratio and the average fuel ratio of the vehicle by operating the display.

17. The method according to claim 11 further comprising:
determining, by the controller, an instantaneous fuel ratio of the vehicle based on a state of the battery for a predetermined time and a moving distance of the vehicle for the predetermined time, and
displaying, by the controller, the error between the guide fuel ratio and the instantaneous fuel ratio of the vehicle by operating the display.

18. The method according to claim 11, wherein determining target charging amount at each of the at least one charging station selected as the stopover based on the guide fuel ratio and the path through stored in the storage includes:
determining, by the controller, the lowest cost charging station among the plurality of charging stations based on charging rates of the plurality of charging stations included in the map data and a distance increased when passing through each of the plurality of charging stations,
selecting, by the controller, the lowest cost charging station as the stopover, and
determining, by the controller, the target charge amount at the lowest cost charging station to be an expected discharge amount of the battery when reaching the lowest cost charging station.

19. The method according to claim 18, wherein determining target charging amount at each of the at least one charging station selected as the stopover based on the guide fuel ratio and the path through stored in the storage includes:
determining, by the controller, a first pass through charging station located within the travelable distance based on charging rate of the plurality of charging stations included in the map data and the distance increased when passing through each of the plurality of charging stations when a distance to the lowest cost charging station is greater than the travelable distance,
selecting, by the controller, the first pass through charging station as the stopover, and
determining, by the controller, the target charge amount at the first pass through charging station based on the distance between the first pass through charging station and the lowest cost charging station.

20. The method according to claim 19, wherein determining target charging amount at each of the at least one charging station selected as the stopover based on the guide fuel ratio and the path through stored in the storage includes:
determining, by the controller, a second pass through charging station located between the lowest cost charging station among the plurality of charging stations and the destination based on the charging rate of the plurality of charging stations included in the map data and the distance increased when passing through each of the plurality of charging stations when a distance from the lowest cost charging station to the destination is greater than the travelable distance of the vehicle when the battery is fully charged; and
selecting, by the controller, the second pass through way point as the stopover.

* * * * *